Patented Aug. 3, 1937

2,088,995

UNITED STATES PATENT OFFICE 2,088,995

DOUBLE COMPOUNDS OF SECONDARY AMIDES OF 3.5-DIMETHYL-ISOXAZOLE-4-CARBOXYLIC ACID AND PROCESS FOR THE MANUFACTURE OF SAME

Max Hoffer, Basel, Switzerland, assignor to Hoffmann-La Roche Inc., Nutley, N. J., a corporation of New Jersey No Drawing. Application September 22, 1936, Serial No. 102,054. In Germany November 22, 1935

4 Claims. (Cl. 260—44)

It has been found that the secondary amides of isoxazole-carboxylic acid which have the following formula:

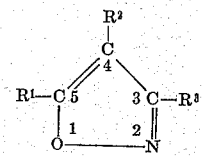

where one of the radicals $R^1$, $R^2$ or $R^3$ represents the group

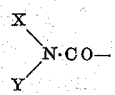

where X and Y are lower aliphatic radicals, and where the other R radicals represent alkyl or hydrogen, described in the applicant's copending application Ser. No. 62,381, filed February 4, 1936, which have proved to be valuable medicines, form crystalline double compounds with calcium salts of aromatic hydroxy acids. The chief value of the new double compounds consists in the possibility of transforming the secondary amides of 3.5-dimethyl-isoxazole-4-carboxylic acid, of the formula

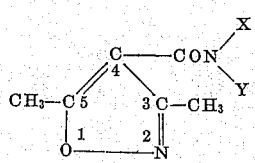

which are mostly liquid or compounds with a low melting point, into solid, stable products. It is a further advantage of the new compounds that the bitter or salty taste of the starting materials is reduced and often quite disappears.

The new compounds may be obtained by dissolving the components in suitable solvents. Often the double compound will directly crystallize from the solvent, or it may be precipitated by the addition of other solvents, in which it is difficultly soluble. It may likewise be obtained by evaporating the solvent. Instead of using the calcium salt as such it may be formed directly in the solution, for instance from calcium carbonate and the acid.

The new compounds are to be used as medicines, as they possess valuable properties as circulatory stimulants.

Example 1

196 parts by weight of 3.5-dimethyl-isoxazole-4-carboxylic-acid-diethylamide are warmed on a steam bath with 2000 parts by weight of water and 278 parts by weight of dry calcium salicylate until everything is dissolved. The double compound consisting of one molecule of calcium salicylate and one molecule of 3.5-dimethyl-isoxazole-4-carboxylic-acid - diethylamide crystallizes in prisms. It is easily soluble in alcohol, rather difficultly soluble in water and has a slightly sweet taste.

Example 2

196 parts by weight of 3.5-dimethyl-isoxazole-4-carboxylic-acid-diethylamide are heated to boiling point with 105 parts by weight of calcium carbonate, 240 parts by weight of p-hydroxybenzoic acid and 2000 parts by weight of water, until the evolution of carbon dioxide has ceased. The hot reaction product is filtered from the excess of calcium carbonate. On cooling the double compound consisting of one molecule of 3.5-dimethyl-isoxazole-4-carboxylic-acid diethylamide and one molecule of calcium p-hydroxybenzoate crystallizes in abundant white needles. The compound is easily soluble in alcohol and hot water, hardly soluble in cold water and has a slightly salty taste.

Example 3

To a solution of 168 parts by weight of 3.5-dimethyl - isoxazole-4-carboxylic - acid - dimethylamide in 500 parts by weight of alcohol 228 parts by weight of calcium β-hydroxy-naphthoate are added at 60–70° C. The calcium salt is rapidly dissolved. By the addition of 1000 parts by weight of water a double compound consisting of one molecule of 3.5-dimethyl-isoxazole-4-carboxylic-acid-dimethylamide and one molecule of calcium β-hydroxynaphthoate is precipitated in crystalline form. It is difficultly soluble in water, easily soluble in alcohol.

I claim:

1. The double compounds of secondary lower aliphatic amides of 3,5-dimethyl-isoxazole-4-carboxylic acid with calcium salts of hydroxy-carboxylic acids of aromatic compounds selected from the group consisting of the benzene and naphthalene series, which are solid stable products and possess valuable properties as circulatory stimulants.

2. The double compond of 3.5-dimethyl-isoxazole-4-carboxylic-acid-diethylamide with calcium p-hydroxybenzoate which crystallizes in abundant white needles, is easily soluble in alcohol and hot water, hardly soluble in cold water and possesses valuable properties as circulatory stimulant.

3. The process for the manufacture of double compounds of the secondary lower aliphatic amides of 3,5-dimethyl-isoxazole-4-carboxylic acid, which consists in allowing secondary lower aliphatic amides of 3,5-dimethyl-isoxazole-4-carboxylic acid to react with calcium salts of hydroxy-carboxylic acids of aromatic compounds selected from the group consisting of the benzene and naphthalene series.

4. The process for the manufacture of the double compound of 3.5-dimethyl-isoxazole-4-carboxylic-acid-diethylamide, which consists in allowing 3.5-dimethyl-isoxazole-4-carboxylic-acid-diethylamide to react with calcium p-hydroxybenzoate.

MAX HOFFER.